United States Patent [19]
Arimilli et al.

[11] Patent Number: 6,061,755
[45] Date of Patent: May 9, 2000

[54] METHOD OF LAYERING CACHE AND ARCHITECTURAL SPECIFIC FUNCTIONS TO PROMOTE OPERATION SYMMETRY

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/839,441

[22] Filed: Apr. 14, 1997

[51] Int. Cl.$^7$ .............................. G06F 13/38; G06F 12/00
[52] U.S. Cl. ...................... 710/128; 710/129; 710/131; 711/146; 711/154
[58] Field of Search ........................... 395/280, 284, 395/289, 306, 308, 309, 311, 800.29, 377; 711/146, 154; 710/100, 104, 109, 126, 128, 129, 131; 712/29, 201

[56] References Cited

U.S. PATENT DOCUMENTS

| | | | |
|---|---|---|---|
| 4,128,890 | 12/1978 | Irwin et al. | 364/724 |
| 4,215,399 | 7/1980 | Pavicic et al. | 364/101 |
| 4,346,436 | 8/1982 | Wise | 364/200 |
| 4,575,792 | 3/1986 | Keeley | 364/51 |
| 4,785,393 | 11/1988 | Chu et al. | 364/200 |
| 4,901,230 | 2/1990 | Chen et al. | 364/200 |
| 4,926,363 | 5/1990 | Nix | 364/579 |
| 5,025,366 | 6/1991 | Baror | 364/200 |
| 5,136,691 | 8/1992 | Baror | 395/200 |
| 5,175,829 | 12/1992 | Stumpf et al. | 295/375 |
| 5,197,128 | 3/1993 | Campbell et al. | 395/876 |
| 5,235,688 | 8/1993 | Taniguchi et al. | 395/425 |
| 5,276,852 | 1/1994 | Callander et al. | 395/425 |
| 5,276,902 | 1/1994 | Nakatani et al. | 395/800 |
| 5,301,278 | 4/1994 | Bowater et al. | 395/275 |
| 5,353,415 | 10/1994 | Wolford et al. | 395/306 |
| 5,361,373 | 11/1994 | Gilson | 395/800 |
| 5,369,753 | 11/1994 | Tipley | 711/122 |
| 5,408,229 | 4/1995 | Yabusaki et al. | 340/825.5 |
| 5,408,627 | 4/1995 | Stirk et al. | 395/425 |
| 5,418,916 | 5/1995 | Hall et al. | 395/375 |

(List continued on next page.)

FOREIGN PATENT DOCUMENTS

| | | | |
|---|---|---|---|
| 0 080 875 A2 | 6/1983 | European Pat. Off. | G11C 9/06 |
| 0 176 972 A2 | 4/1986 | European Pat. Off. | G06F 12/08 |
| 0 240 606 A2 | 10/1987 | European Pat. Off. | G06F 9/38 |
| 0 251 716 A2 | 1/1988 | European Pat. Off. | G06F 9/28 |
| 0 272 705 A2 | 6/1988 | European Pat. Off. | G06F 9/38 |
| 0 297 943 AE | 1/1989 | European Pat. Off. | G06F 9/26 |
| 0 301 921 A2 | 2/1989 | European Pat. Off. | G06F 13/18 |
| 0 258 559 A2 | 3/1999 | European Pat. Off. | G06F 12/08 |
| 09022380 | 1/1997 | Japan | G06F 12/08 |
| 2 077 965 | 12/1981 | United Kingdom | G06F 9/38 |
| 2 107 092 | 4/1983 | United Kingdom | G06F 12/06 |
| 2 256 512 | 12/1992 | United Kingdom | G06F 12/08 |
| 2 302 190 | 11/1995 | United Kingdom | G06F 9/38 |
| 87/04823 A1 | 8/1987 | WIPO | G06F 12/08 |

*Primary Examiner*—Xuan M. Thai
*Attorney, Agent, or Firm*—Richard A. Henkler; Daniel E. Venglarik; Andrew J. Dillon

[57] ABSTRACT

Cache and architectural functions within a cache controller are layered so that architectural operations may be symmetrically treated regardless of whether initiated by a local processor or by a horizontal processor. The same cache controller logic which handles architectural operations initiated by a horizontal device also handles architectural operations initiated by a local processor. Architectural operations initiated by a local processor are passed to the system bus and self-snooped by the controller. If necessary, the architectural controller changes the operation protocol to conform to the system bus architecture.

17 Claims, 5 Drawing Sheets

U.S. PATENT DOCUMENTS

| | | | |
|---|---|---|---|
| 5,434,993 | 7/1995 | Liencres et al. | 395/425 |
| 5,463,753 | 10/1995 | Fry et al. | 711/146 |
| 5,465,334 | 11/1995 | Sato | 395/800.32 |
| 5,485,590 | 1/1996 | Hyatt et al. | 395/442 |
| 5,524,233 | 6/1996 | Milburn et al. | 711/141 |
| 5,535,360 | 7/1996 | Cassetti | 395/467 |
| 5,537,572 | 7/1996 | Michelsen et al. | 395/462 |
| 5,544,345 | 8/1996 | Carpenter et al. | 395/477 |
| 5,553,263 | 9/1996 | Kalish et al. | 395/454 |
| 5,557,769 | 9/1996 | Bailey et al. | 395/473 |
| 5,584,013 | 12/1996 | Cheong et al. | 395/449 |
| 5,598,550 | 1/1997 | Shen et al. | 711/146 |
| 5,613,153 | 3/1997 | Arimilli et al. | 395/821 |
| 5,623,632 | 4/1997 | Liu et al. | 711/144 |
| 5,625,829 | 4/1997 | Gephardt et al. | 395/311 |
| 5,644,753 | 7/1997 | Ebrahim et al. | 395/458 |
| 5,659,715 | 8/1997 | Wu et al. | 395/497.01 |
| 5,668,972 | 9/1997 | Liu et al. | 711/136 |
| 5,671,355 | 9/1997 | Collins | 395/200 |
| 5,710,905 | 1/1998 | Wan | 395/445 |
| 5,732,408 | 3/1998 | Takahashi | 711/113 |
| 5,734,387 | 3/1998 | Patrick et al. | 345/441 |
| 5,745,058 | 4/1998 | Auerbach et al. | 341/51 |
| 5,745,762 | 4/1998 | Celi, Jr. et al. | 395/681 |
| 5,748,985 | 5/1998 | Kanai | 395/457 |
| 5,751,975 | 5/1998 | Gillespie et al. | 395/306 |
| 5,751,983 | 5/1998 | Abramson et al. | 395/392 |
| 5,752,047 | 5/1998 | Darty et al. | 395/750.01 |
| 5,761,524 | 6/1998 | Peterson et al. | 395/800.41 |
| 5,761,725 | 6/1998 | Zeller et al. | 711/146 |
| 5,774,683 | 6/1998 | Gulik | 395/309 |

METHOD OF LAYERING CACHE AND ARCHITECTURAL SPECIFIC FUNCTIONS TO PROMOTE OPERATION SYMMETRY

RELATED APPLICATIONS

The present invention is related to the subject matter of the following commonly assigned copending U.S. patent applications, each filed Apr. 14, 1997: Ser. No. 08/839,442, now pending, entitled "Method of Layering Cache and Architectural Specific Functions"; Ser. No. 08/834,115, now pending, entitled "Method of Layering Cache and Architectural Specific Functions to Expedite Multiple Designs"; Ser. No. 08/834,114, now pending, entitled "Method of Layering Cache and Architectural Specific Functions for Splitting Operations"; Ser. No. 08/839,445, now pending, entitled "Method of Layering Cache and Architectural Specific Functions to Permit Generic Interface Definition"; and Ser. No. 08/839,443, now pending, entitled "Method of Layering Cache and Architectural Specific Functions to Facilitate Design Extension." The content of the above-mentioned copending applications is incorporated herein by reference.

BACKGROUND OF THE INVENTION

1. Technical Field

The present invention relates in general to cache controllers in data processing systems and in particular to cache controllers which layer cache and architectural specific functions. Still more particularly, the present invention relates to symmetric treatment of operations within a layered cache controller design.

2. Description of the Related Art

Data processing systems which utilize a level two (L2) cache typically include a cache controller for managing transactions affecting the cache. Such cache controllers are conventionally implemented on a functional level, as depicted in FIG. 5. For example, a cache controller 502 may include logic 504 for maintaining the cache directory, logic 506 for implementing a least recently used (LRU) replacement policy, logic for managing reload buffers 508, and logic for managing store-back buffers 510. In traditional implementations, the cache is generally very visible to these and other architectural functions typically required for cache controllers, with the result that cache controller designs are specific to a particular processors such as the PowerPC™, Alpha™, or the x86 family of processors.

In multiprocessor systems, the cache controller must support operations which may either be initiated by an upstream or local processor or initiated by a horizontal or non-local processor and snooped on the system bus by the cache controller. Therefore, a conventional implementation includes both processor-side logic 514 and system-side logic 516 for handling specific operations. Since similar operations may be initiated by either a local processor or a horizontal processor, logic 514 and 516 may be substantially duplicative. The duplicative logic is included, however, for the purpose of accelerating response to an architectural operation initiated by a local processor.

The controller design depicted in FIG. 5 requires duplicative, complex, silicon-intensive logic for responding architectural operations initiated either by a local processor or by a horizontal processor or lower level cache. The design also requires interlocks between units within the controller which respond to different operations.

It would be desirable, therefore, to implement a cache controller which avoids duplication of logic required to respond to a given operation. It would further be advantageous to provide a cache controller design eliminating the need for interlock logic relating to architectural operations within the cache controller.

SUMMARY OF THE INVENTION

It is therefore one object of the present invention to provide an improved cache controller for a data processing system.

It is another object of the present invention to provide an improved cache controller having layered cache and architectural specific functions.

It is yet another object of the present invention to provide a cache controller design supporting symmetric treatment of operations within a layered cache controller design.

The foregoing objects are achieved as is now described. Cache and architectural functions within a cache controller are layered so that architectural operations may be symmetrically treated regardless of whether initiated by a local processor or by a horizontal processor. The same cache controller logic which handles architectural operations initiated by a horizontal device also handles architectural operations initiated by a local processor. Architectural operations initiated by a local processor are passed to the system bus and self-snooped by the controller. If necessary, the architectural controller changes the operation protocol to conform to the system bus architecture.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
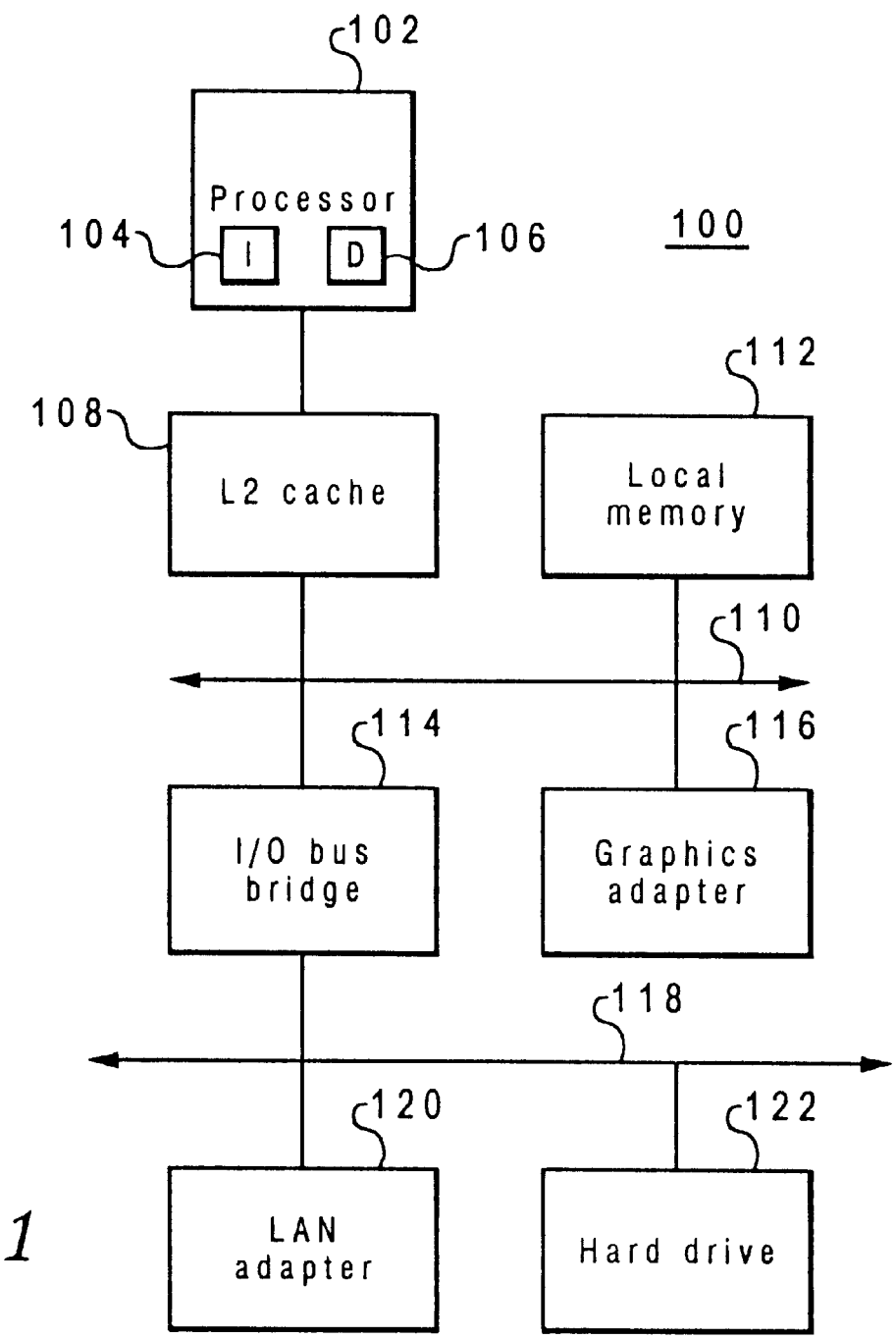
FIG. 1 depicts a data processing system implemented with a cache controller design in accordance with a preferred embodiment of the present invention.

With reference now to the figures, and in particular with reference to FIG. 1, a data processing system implemented with a cache controller design in accordance with a preferred embodiment of the present invention is depicted. Data processing system 100 may include only a single processor or may be a symmetric multiprocessor (SMP) system including a plurality of processors. A single processor system is shown in the example depicted. Processor 102 may be a superscalar reduced instruction set computing (RISC) processor including separate level one instruction and data caches 104 and 106 within the processor. A PowerPC™ processor may be utilized for processor 102.

Processor 102 is connected to a level two (L2) cache 108, which is a nonshared cache. A second processor (not shown) may be added to the system depicted, either with a separate L2 cache or sharing L2 cache 108 with processor 102. L2 cache 108 is connected to system bus 110 for data processing system 100. Local memory 112 is also connected to system bus 110, as is I/O bus bridge 114. Other devices, such as memory-mapped graphics adapter 116, may also be connected to system bus 110. I/O bus bridge 114 is connected to I/O bus 118, which may be connected to a variety of other devices such as local area network (LAN) adapter 120 and hard disk drive 122.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural imitations with respect to the present invention. In particular, a data processing system need not be limited to a single processor as shown in the depicted example to benefit from the present invention. The present invention may be employed, for example, to improve the performance of a data processing system having two processors, each with a corresponding L2 cache.

Figure 2:
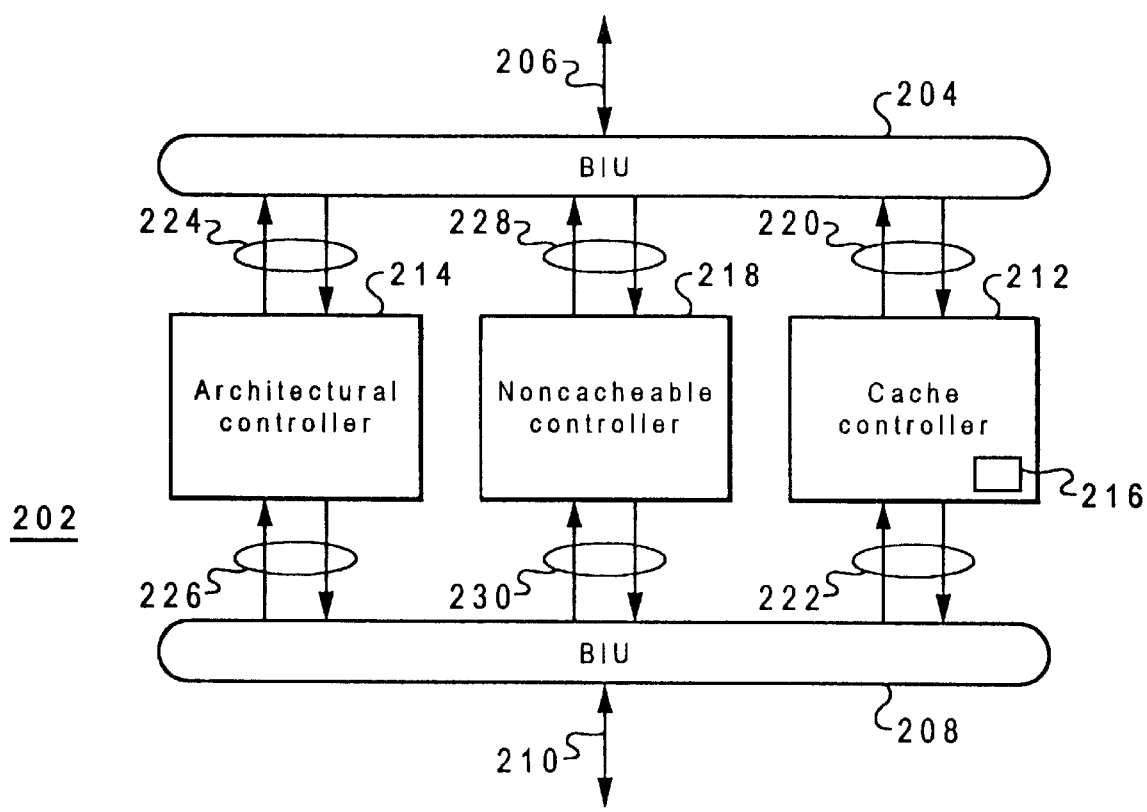
FIG. 2 is a block diagram of a cache controller design in accordance with a preferred embodiment of the present invention.

Referring to FIG. 2, a block diagram of a cache controller design in accordance with a preferred embodiment of the present invention is illustrated. Controller 202 is implemented within cache 108 depicted in FIG. 1. Controller 202 includes a bus interface unit (BIU) 204 connected to an upper bus 206 for a processor or a higher level cache, and a bus interface unit 208 to a lower bus 210, which may be a system bus or a bus to another cache. Upper bus 206 and lower bus 210 may differ; upper bus 206 may be, for example, a 60X bus, while lower bus 210 may be a different bus.

Cache and architectural specific functions within controller 202 are layered. Thus, controller 202 includes cache controller 212 and architectural controller 214. Operations are distinguished as "cache" or "architectural" operations. Only cache operations are handled by cache controller 212, and only cache controller 212 performs operations on cache 216. Architectural operations are handled by architectural controller 214 and are seen by cache controller 212 as system-side operations.

A third unit, noncacheable controller 218, is also contained within cache controller 202. Noncacheable controller 218 is actually a counterpart to cache controller 212 in that it also handles only cache operations. Whereas cache controller 212 handles cache operations directed at cache memory locations, noncacheable controller 218 handles cache operations directed at memory locations which do not map to cache 216. It is advantageous, for reasons known to those skilled in the art, to treat part of the system memory as noncacheable. Such memory may be utilized, for example, by memory mapped devices. While cache controller 212 operates on full cache blocks, noncacheable controller 218 operates on smaller memory segments, typically less than 8–16 bytes. Moreover, noncacheable controller 218 does not store data, while cache controller 212 retains copies of data handled within cache 216.

Cache operations are typically those operations which read or write values to memory locations, and therefore may change or retrieve the value of data in a memory location. Remaining operations are defined as architectural operations. Unlike cache operations, architectural operations generally do not change the value of data in a memory location. An architectural operation may move the data to a different location within the cache hierarchy, change the status of data in a particular memory location, or perform other such functions. However, architectural operations generally do not directly alter the value of data within a memory location.

Cache operations, supported by cache controller 212, comprise the largest majority of operations affecting the system cache. Within the complete set of operations supported by a given processor, cache operations may not derive from the portion of the instruction set which is most frequently executed and/or consume the largest majority of processor cycles. However, disregarding instructions directed to other functional units within the processor, such as the floating point, fixed point, or branch units, cache operations are, collectively, executed most often and utilize the largest measure of time.

The remaining operations affecting a system cache—those employed for cache management, operating system management, page management, and synchronization, etc.—are layered out and supported by architectural controller 214. Virtually all processor architectures support such operations, which are utilized in real time operation much less frequently than cache operations. Additionally, individual operations among the architectural operations are generally implemented, if at all, in substantially divergent manners for different processors of interest. Processor-side architectural operations pass through architectural controller 214 to system bus 210 and affects cache controller 212 as apparent system-side architectural operations.

Different designs may vary the set of operations supported by the cache controller and, by default, the remaining operations layered for support by the architectural controller. However, increasing the number of operations supported by the cache controller increases the complexity of logic required. Additionally, if instructions selected for support by the cache controller are not supported by all processors of interest, the cache controller design loses its direct transferability to new controller designs.

While certain operations pass down only one path within controller 202—that is, through architectural controller 214 or cache controller 212—other operations are split and pass down both paths. Cache controller 212 employs a pass-through design, in which operations initiated at interface 220 generate a response at interface 222 while operations initiated at interface 222 produce a responsive action at interface 220.

Because cache and architectural operations are layered within controller 202, bus transactions and protocols may also be layered. That is, generic interfaces may be defined for cache controller 212, architectural controller 214, and noncacheable controller 218. Thus, interfaces 220–230 comprise generic protocol interfaces to bus interface units 204 and 208 which are, to the extent possible, not architecturally specific. This decouples the design for cache controller 212 from the specific protocols of bus 206 and bus 210, allowing the design for cache controller 212 to be reused. Bus interface units 204 and 208 are responsible for managing transactions and protocols to bus 206 and system bus 210, translating the specific bus transactions into the protocol for generic interfaces 220–230. By employing generic interfaces for interfaces 220–230, the designs for controllers 212, 214, and 218 are isolated from specific bus architectures and may be readily duplicated.

In contrast to traditional cache controllers, cache controller 212 may thus be implemented in a manner independent of the two buses 206 and 210, responding only to cache operations. Although such cache operations are initiated by transactions on either bus 206 or bus 210, only certain bus transactions will prompt a response within cache controller 212. In a preferred embodiment, cache controller 212 only responds to instruction fetch operations (IFETCH), LOAD operations, and WRITE operations on bus 206, and to READ operations, WRITE operations, and traditional SNOOPS on bus 210. This results in substantially simplified design requirements for cache controller 212. This is accomplished by avoiding the usual practice of overlaying the highly irregular (semantically and temporally) architectural operations and cache operations. The burden of responding to the architectural operations is removed from the design of cache controller 212 and placed in architectural controller 214.

The cache operations handled by cache controller 212 are supported by every commercial processor of interest in substantially the same form. Only minor differences in specific implementation, from which cache controller 212 in the present invention is decoupled by generic interfaces 220 and 222, distinguish comparable instructions for different processors of interest.

By layering selected cache and architectural functions, and implementing generic interfaces to bus interface units 204 and 208, a large portion of the overall design of controller 202 may be directly transferred to new implementations. The cache controller logic may be reused without modification for cache operations. New sleeves of logic for the bus interface units may be easily implemented for handling new bus protocols and converting the generic protocol interfaces 220–230 of cache, architectural, and noncacheable controllers 212, 214, and 218 to interfaces for bus 206 and bus 210. The most significant effort for implementing a design supporting a different processor is required by the architectural controller. Individual design of the logic supporting the architectural operations is required in any case since processor architectures vary dramatically. Overall, however, a significant savings in design effort for different processors may be achieved since only the semantics of operations handled by architectural controller 214 will change.

By layering cache and architectural functions, limiting cache controller 212 to responding to a few fundamental operations, the cache controller logic is greatly streamlined and simplified. In addition, the architectural controller logic is also simplified since, by separating the two classes of operations, issues of interrelationships between operations in different classes are eliminated. The cache and architectural controllers may be designed as individual units.

Figure 3:
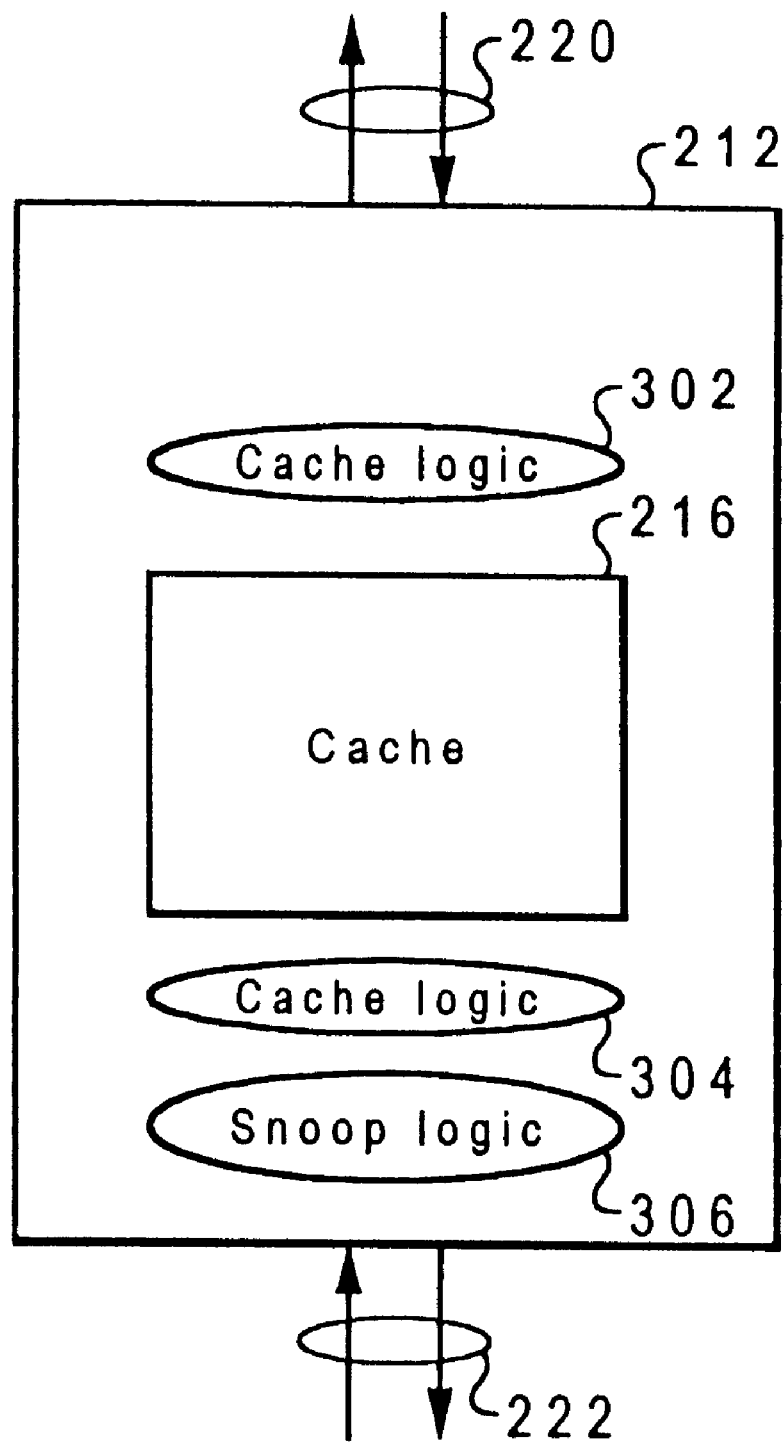
FIG. 3 depicts a block diagram of a cache controller in accordance with a preferred embodiment of the present invention.

With reference now to FIG. 3, a block diagram of a cache controller in accordance with a preferred embodiment of the present invention is depicted. Cache controller 212 includes processor-side logic 302 for handling READ and WRITE operations initiated by local processor 108. Logic 302 is necessary since an operation initiated by a local processor may require that data be returned to the local processor. Cache controller 212 also includes system-side logic 304 for handling READs and WRITEs and system-side logic 306 for snooping operations received on the system bus from a horizontal processor or a lower level cache. Snoop logic 306 handles all READs and WRITEs and some architectural operations initiated by a horizontal processor or a lower level cache. Some architectural operations received on the system bus do not need to be snooped and are passed to the processor bus by architectural controller 214 depicted in FIG. 2.

Unlike the dual units 302 and 304 necessary for handling cache operations, logic 306 for handling architectural operations is not duplicated and is included only on the system side of cache controller 212. Logic 306 handles all architectural operations snooped on the system bus, whether initiated by a local processor or by a horizontal processor or lower level cache or device. Logic 306 also handles snoops for cache READ and WRITE operations. Logic 306 must be included in the design of cache controller 212 in any case to handle architectural operations snooped on the bus. Even in traditional implementations, downstream logic for handling architectural operations achieves, for many operations supported by the architecture, the same result as upstream logic for handling architectural operations. Therefore, cache controller 212 includes no processor-side logic for handling architectural operations except that required to dispatch the operation to the system bus. Instead, snoop logic 306 handles all architectural operations having an effect on cache 216.

Referring again to FIG. 2, architectural controller 214 responds to architectural operations detected on bus 206. These architectural operations are passed by architectural controller 214 to system bus 210. Generally architectural controller 214 merely buffers the operation through to system bus 206, although in some instances architectural controller 214 may be required to perform some action on the operation. Once presented on system bus 210, the operation is self-snooped by controller 202 and, if some action to cache 216 is required, handled by logic 306 within cache controller 212.

Traditional cache controller implementations process architectural operations on the upstream side. Frequently architectural operations must be presented to the system bus by the cache controller to be snooped by other processors or devices. The present invention passes essentially all architectural operations through the architectural controller onto the system bus. The controller then self-snoops the operation and processes it in the cache controller as if initiated by a horizontal processor or lower level cache.

The motivation for placing logic handling architectural operations on both the upstream and downstream sides of a cache controller is principally to speed response, within a local processor's hierarchy, to an operation initiated by that processor. However, since many architectural operations require action in horizontal caches, the operation must be presented on the system bus in any event. The time required for the horizontal caches to respond to the operation will typically dominate. Thus the performance benefits of the conventional implementation are isolated. While the controller's response to architectural operations initiated by a local processor is slightly delayed, such operations occur so infrequently—as seldom as once every 20,000 operations in real applications—that an overall performance gain is achieved by improving the cache controller design.

In addition to a net performance gain, the snoop logic employed in the present invention is already required in multiprocessor systems. No additional logic is required for snooping, and the duplicated processor-side logic for handling architectural operations may be eliminated, reducing the size of the cache controller design. Interlocks between processor-side and system-side logic handling architectural operations are unnecessary, simplifying the cache controller design and further reducing the size. Because the complexity of the cache controller is greatly reduced, understanding of its operation is aided and the design is generally more robust and free of bugs. An overall increase in the speed of the cache controller may also be achieved.

In the present invention, virtually all architectural functions are passed to the system bus, which is usually accessible to a logic analyzer or other test equipment. In some designs, particularly those where the processor and cache are implemented in the same integrated circuit processing unit, debugging is hampered by an inability to determined what operations are occurring when a problems arises. Passing architectural operations to the system bus allows a logic analyzer to detect such operations. Performance traces may also be developed from the system bus.

By forcing more architectural operations onto the system bus, new optimizations are enabled. When more operations are visible on the system bus, more information becomes available from which the semantics of the operations may be beneficially altered or advantageously employed.

Figure 4:
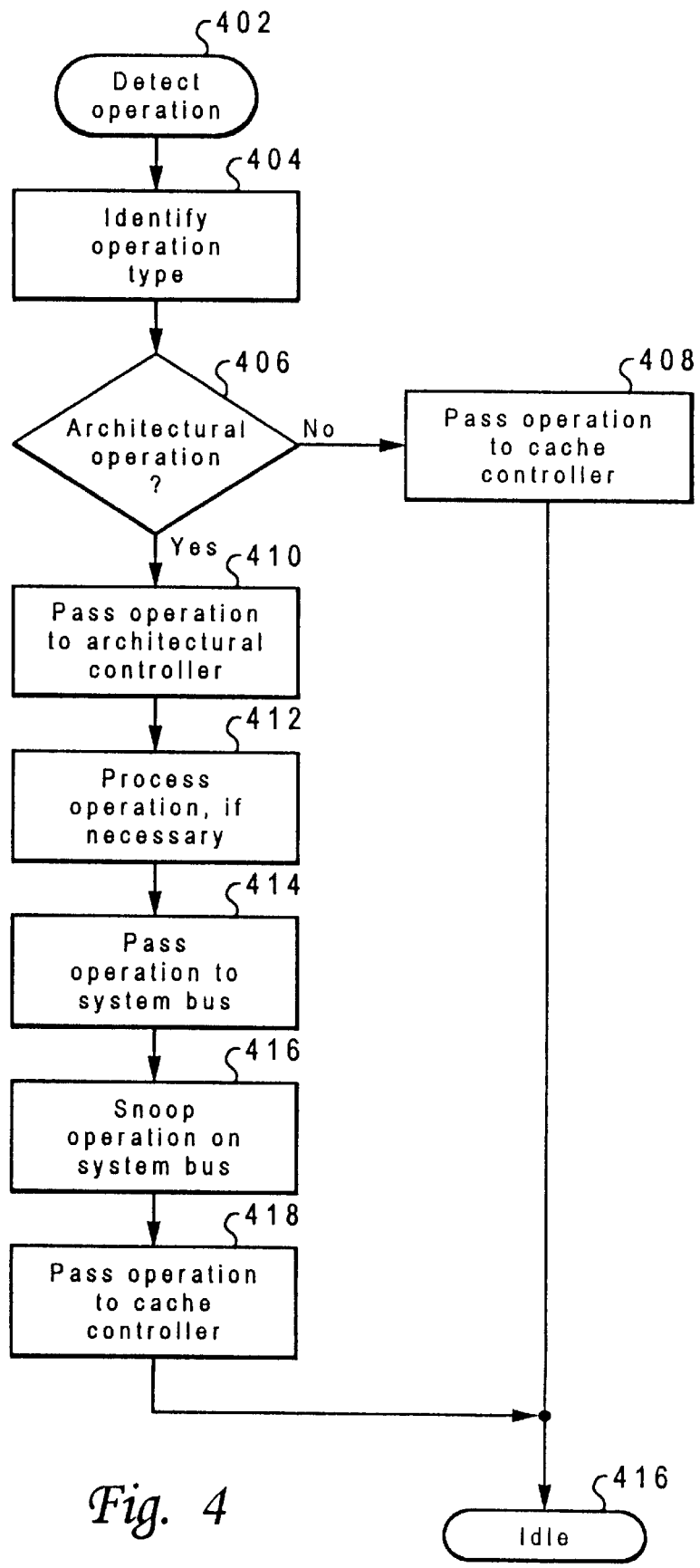
FIG. 4 is a high level flowchart for a processing of managing operations in a data processing system having a plurality of processing units capable of initiating operations in accordance with a preferred embodiment of the present invention.
Figure 5:
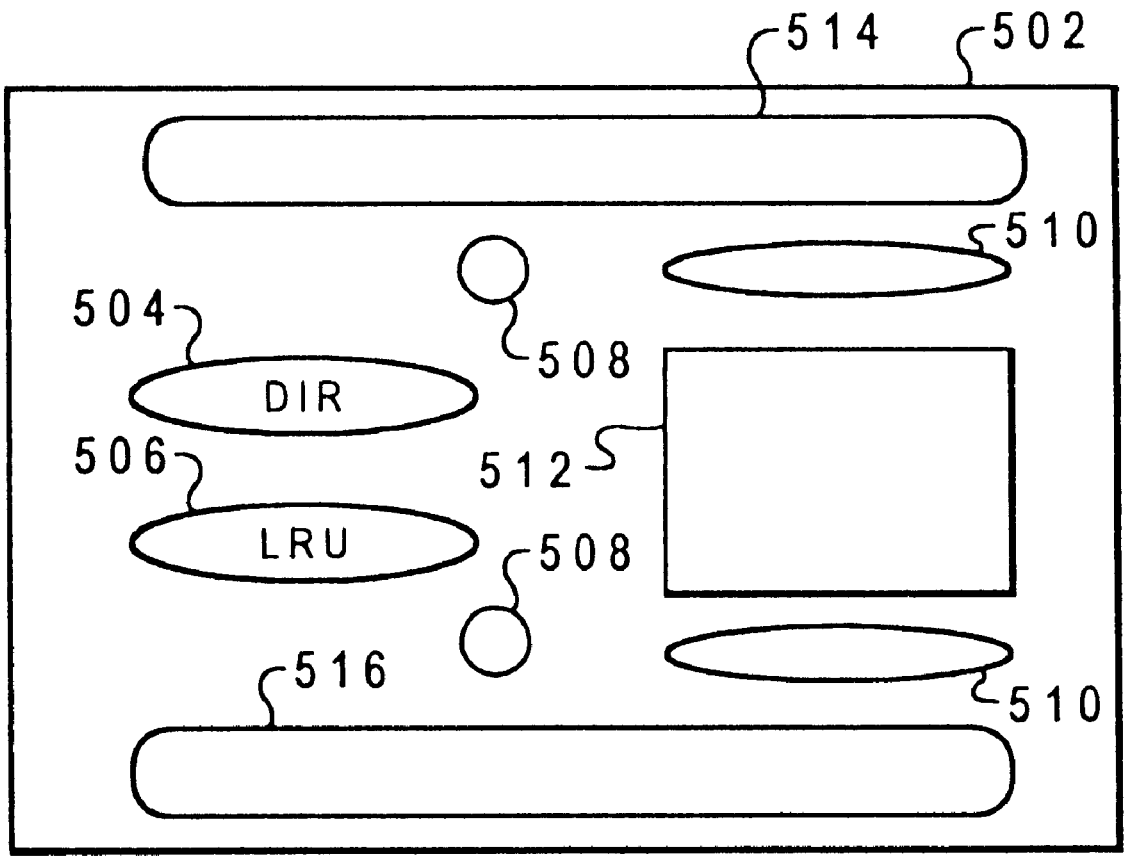
FIG. 5 depicts a prior art cache controller design.

With reference now to FIG. 4, a high level flowchart for a processing of managing operations in a data processing system having a plurality of processing units capable of initiating operations in accordance with a preferred embodiment of the present invention is depicted. The process begins at step 402, which depicts detection of an operation. The process then passes to step 404, which illustrate identification of the operation type. The process next passes to step 406, which depicts a determination of whether the operation is an architectural operation.

If the operation is not an architectural operation, the process proceeds to step 408, which illustrate the operation being passed to the cache controller, where the operation may be performed. If the operation is an architectural operation, however, the process proceeds instead to step 410, which depicts passing the operation to the architectural controller. The process then passes to step 412, which illustrates processing the operation as necessary, such as by altering the operation protocol to conform to the system bus.

The process next passes to step 414, which depicts passing the operation to the system bus, and then to step 416, which illustrates self-snooping the operation on the system bus. The process then passes to step 418, which depicts passing the operation to the cache controller, where the operation may be perform as though it originated on the system bus. From either of step 408 or 418, the process finally passes to step 420, which illustrates the process becoming idle until another operation is detected.

The present invention simplifies the controller design for an intermediate cache by layering architectural and cache specific functions so that architectural operations received on one bus may be passed around the cache controller and presented to the other bus. The operations are self-snooped from the second bus and handled by the cache controller as if originating from that bus. Functional logic within the cache controller for handling architectural operations need not be duplicated, reducing complexity and increasing speed. Architectural operations passed to the system bus are visible for debugging and performance trace purposes.

While the invention has been particularly shown and described with reference to a preferred embodiment, it will be understood by those skilled in the art that various changes in form and detail may be made therein without departing from the spirit and scope of the invention.

What is claimed is:

1. A method of handling operations in a data processing system having a plurality of devices capable of initiating operations, comprising:

detecting, within control logic for a storage device coupled to a first bus, an operation on the first bus targeting data storage within the storage device;

utilizing the control logic, passing the detected operation through the storage device to a second bus coupled to the device without performing the detected operation on the targeted data storage within the storage device;

snooping the operation on the second bus utilizing snoop logic for the storage device; and in response to snooping the operation on the second bus, performing the snooped operation on the targeted data storage within the storage device.

2. The method of claim 1, wherein the step of detecting, within control logic for a storage device coupled to a first bus, an operation on the first bus targeting data storage within the storage device bus further comprises:

receiving the operation from a processor coupled to the first bus.

3. The method of claim 1, wherein the step of snooping the operation on the second bus further comprises:

snooping the operation on a bus coupling the device to a horizontal processor.

4. The method of claim 1, wherein the step of snooping the operation on the second bus further comprises:

snooping the operation on a bus coupling the device to a system memory.

5. A controller, comprising:

a first controller unit for a data storage device, the first controller unit snooping operations on a first bus coupled to the data storage device; and a second controller unit for the data storage device, the second controller unit passing operations initiated on a second bus coupled to the data storage device and targeting data storage within the data storage device to the first bus without performing the operations on the targeted data storage within the data storage device, wherein the first controller unit, after snooping the operations passed to the second bus by the first controller unit, performs the operations on the targeted data storage within the storage device.

6. The controller of claim 5, wherein the first controller unit is coupled to a system bus.

7. The controller of claim 5, wherein the second controller unit is coupled to a processor.

8. The controller of claim 5, wherein the data storage device further comprises:

a cache coupled to the first and second controller units, wherein the operations targeting data storage within the data storage device target cache segments.

9. The controller of claim 8, further comprising:

a first bus interface unit coupling the first and second controller units to the first bus;

a second bus interface unit coupling the first and second controller units to the second bus.

10. A method of performing operations, comprising:

detecting an operation targeting a storage device within a storage hierarchy on a first bus coupling the storage device to an upper portion of the storage hierarchy;

initiating the detected operation on a second bus coupling the storage device to a lower portion of the storage hierarchy without performing the detected operation within the storage device; and responsive to detecting the operation on the second bus, performing the operation within the storage device.

11. The method of claim 10, wherein the step of detecting an operation targeting a storage device within a storage hierarchy on a first bus coupling the storage device to an upper portion of the storage hierarchy further comprises:

receiving the operation from a processor coupled to the first bus.

12. The method of claim 10, wherein the step of detecting an operation targeting a storage device within a storage hierarchy on a first bus coupling the storage device to an upper portion of the storage hierarchy further comprises:

receiving the operation from a higher level cache coupled to the first bus.

13. The method of claim 10, wherein the step of initiating the detected operation on a second bus coupling the storage device to a lower portion of the storage hierarchy further comprises:

passing the detected operation through the storage device to the second bus without performing the operation within the storage device.

14. The method of claim 10, further comprising:

snooping the operation on the second bus.

15. The method of claim 10, wherein the step of performing the operation within the storage device further comprises:

performing an operation received from a processor vertically above the storage device within a storage hierarchy as though received from a processor horizontally above the storage device within the storage hierarchy.

16. The method of claim 10, wherein the step of performing the operation within the storage device further comprises:

performing an operation received from a higher level cache within a storage hierarchy including the storage device as though received from a horizontal cache within the storage hierarchy.

17. The method of claim 10, wherein the step of performing the operation within the storage device further comprises:

performing the operation on target data storage within the storage device.

\* \* \* \* \*